Patented Oct. 18, 1932

1,882,735

UNITED STATES PATENT OFFICE

CLIFFORD L. BARBER, OF CHICAGO, ILLINOIS, ASSIGNOR TO KESTER SOLDER COMPANY, OF CHICAGO, ILLINOIS, A CORPORATION OF ILLINOIS

SOLDERING FLUX

No Drawing.   Application filed March 17, 1930.  Serial No. 436,645.

This invention relates to a soldering flux having particular utility either in cored solders or as an external flux and to a process for forming the same.

Present day soldering fluxes having high endurance and stability are in general of two classes, namely, the organic, non-corrosive rosin flux and the ordinary astringent, inorganic "chloride" flux. The latter flux is, as a rule, more stable, fast and efficient for most metals than the rosin flux and, accordingly, has a wider range of practical use.

The usual chloride flux, however, is objectionable in that it is itself corrosive and leaves a residue which is not only corrosive but also electrically conductive and, thereby, promotes current leakage.

The major constituent of these inorganic "chloride" fluxes is an ionizable salt of a weak base and hydrochloric acid and, accordingly, the residue left from the use of such fluxes will in the presence of moisture hydrolyze to liberate hydrochloric acid as follows:

$$MCl + HOH = MOH + HCl$$

The corrosive action of the flux and, of course, of the residue is in a large measure due to the hydrochloric acid so liberated. Moreover, the ionizable salt of these fluxes is hygroscopic and, it is, therefore, impossible to prevent hydrolysis of the flux residue by vaporizing the water in the same because the salt being hygroscopic repeatedly takes up moisture from the atmosphere in sufficient amounts to cause hydrolysis.

It accordingly follows from this consideration that in order to overcome the corrosive action resulting from the use of the inorganic "chloride" fluxes that it is necessary to prevent hydrolysis of the flux residue and thus eliminate the objectional features arising from the result of hydrolysis.

Now, if a weak acid is combined with a weak base to form the flux, it is evident that even if hydrolysis of the flux desidue ensues, the products of the hydrolysis will not be strongly acid. Furthermore, if the weak base and weak acid react to produce a salt which is insoluble in aqueous solvents then hydrolysis of the salt cannot take place.

A salt of this nature is formed when a weak base, zinc hydroxide, is reacted with a weak acid such as a fatty acid; for instance, stearic acid. The salt, zinc stearate resulting from this reaction is substantially noncorrosive, non-hygroscopic, substantially insoluble in all solvents, possesses a low dielectric constant and has a grease-like physical character which renders the salt resistant to attack by the atmosphere. This salt, therefore, possesses all the ideal physical characteristics necessary in a soldering flux. Its practical worth as a flux, however, is not great because its fluxing action is too slow.

I have now found that if a salt such as a chloride of zinc is employed in place of the above weak base and reacted with a fatty acid such as stearic acid, a flux is produced having all the desirable physical characteristics of zinc stearate and in addition a fluxing power as great as that of zinc chloride or stearic acid.

It is, accordingly, an object of this invention to produce a stable, fast soldering flux which is non-hygroscopic, substantially insoluble in aqueous solvents, possesses a low dielectric constant and has a relatively high fluxing power.

It is a further object of this invention to provide a flux consisting of the reaction product of a chloride of zinc and a fatty acid.

It is a further object of this invention to provide a process for preparing a soldering flux by fusing together a chloride of zinc and a fatty acid.

Other and further important objects of this invention will become apparent from the following description and appended claims.

In the preferred form of my invention, from about 8 to 20 parts by weight of zinc chloride are fused with 88 parts by weight of stearic acid, the fusion being continued until the zinc chloride is completely converted or used up. Upon cooling the fusion mixture, a product is obtained which from a fluxing standpoint possesses all the ideal properties of zinc stearate and in addition a high fluxing power. While the amount of zinc chloride used may vary as indicated, best results are obtained by employing 12 parts of this chloride.

This flux, as it is substantially insoluble, leaves a residue which cannot hydrolyze to liberate a corrosive acid. As a matter of fact, the flux is relatively non-corrosive, for it is practically chemically inert when cold and, moreover, has a grease-like physical character which successfully resists any attach by the atmosphere and, hence, once the soldering action is complete, the residue is not ordinarily subjected to any chemical change.

The residue from this flux is not conducive to current leakage as the dielectric constant of the flux is relatively small.

Furthermore, this flux is fast, stable and efficient on a number of metals; does not splash flux or solder when used in cored solder; does not leak from an unsealed solder end in the manner of the inorganic "chloride" fluxes and is perfectly harmless to its users.

The exact reaction which takes place between the zinc chloride and stearic acid in producing this flux is not clearly understood. The reaction does not produce zinc stearate alone, however, because the product formed has a far greater fluxing power than that of zinc stearate. Apparently, some neutral zinc salt of stearic acid, such as the hydrochloride, is formed, which like rosin is active when hot but completely inert when cold. This explanation, however, is merely a theory and should not, therefore, be construed as a limitation on my process or product.

While this invention has been particularly described in connection with stearic acid, it should be understood that other fatty acids, such as oleic or palmitic or a mixture of any three, may be used. In fact, the product obtained by reacting zinc chloride with oleic acid possesses certain physical characteristics which particularly adapt it for use as an external flux. When the fatty acids consist of about 2 parts oelic or palmitic acid and 8 parts stearic, the product obtained is somewhat more mobile than that obtained with stearic acid alone and can more easily be applied to a soldering surface and its residue more easily removed therefrom after the soldering operation.

While I have disclosed a preferred embodiment of my invention, it is to be understood that changes may be made in the various features disclosed without departing from the spirit of the invention and, accordingly, I do not purpose to limit my invention except as is necessitated by the prior art.

I claim as my invention:

1. The process of forming a composition useful as a soldering flux, which comprises fusing together an anhydrous mixture of about 12 parts of zinc chloride and about 88 parts of stearic acid until all of the zinc chloride has chemically combined with the stearic acid.

2. A soldering flux comprising the anhydrous fusion product of about 12 parts of zinc chloride and about 88 parts of stearic acid, said fusion product being substantially free from free zinc chloride.

3. The process of forming a composition useful as a soldering flux which comprises fusing about 8 to 20 parts of zinc chloride with not less than 88 parts of stearic acid until all of the zinc chloride has chemically combined with the stearic acid.

4. A soldering flux comprising the anhydrous fusion product of about 8 to 20 parts of zinc chloride and not less than 88 parts of stearic acid, said fusion product being substantially free from free zinc chloride.

5. The process of forming a composition useful as a soldering flux which comprises fusing about 8 to 20 parts of zinc chloride with not less than 88 parts of a mixture of oleic and stearic acids, the oleic and stearic acids being in the ratio of about 1 to 4 parts by weight, until all of the zinc chloride has been converted.

6. A soldering flux comprising the fusion product of about 8 to 20 parts of zinc chloride with not less than 88 parts of a mixture of oleic and stearic acids, the oleic and stearic acids being in the ratio of about 1 to 4 parts by weight, said fusion product being free from free zinc chloride.

7. The process of forming an anhydrous composition useful as a soldering flux which comprises reacting about 8 to 20 parts of zinc chloride with not less than 88 parts of a fatty acid selected from the group consisting of oleic, palmitic and stearic acids to chemically convert all of the zinc chloride.

8. A soldering flux comprising an anhydrous reaction product of about 8 to 20 parts of zinc chloride with not less than 88 parts of a fatty acid selected from the group consisting of oleic, palmitic and stearic acids, said product being free from free zinc chloride.

In testimony whereof I have hereunto subscribed my name at Chicago, Cook County, Illinois.

CLIFFORD L. BARBER.